(12) United States Patent
Midlam-Mohler

(10) Patent No.: US 7,051,514 B2
(45) Date of Patent: May 30, 2006

(54) SYSTEM AND METHOD FOR REDUCING NOX EMISSIONS AFTER FUEL CUT-OFF EVENTS

(75) Inventor: Shawn Midlam-Mohler, Columbus, OH (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/710,650

(22) Filed: Jul. 27, 2004

(65) Prior Publication Data

US 2006/0021326 A1     Feb. 2, 2006

(51) Int. Cl.
*F02M 25/06* (2006.01)

(52) U.S. Cl. .............................. 60/278; 60/285; 60/283
(58) Field of Classification Search ................. 60/278, 60/274, 285; 123/90.11
See application file for complete search history.

(56) References Cited

U.S. PATENT DOCUMENTS

| | | | |
|---|---|---|---|
| 3,709,201 A * | 1/1973 | Cook | 123/64 |
| 3,935,850 A * | 2/1976 | King | 123/520 |
| 4,021,677 A | 5/1977 | Rosen et al. | |
| 4,116,184 A * | 9/1978 | Tomita | 123/438 |
| 4,149,500 A * | 4/1979 | Aoyama | 123/676 |
| 4,274,141 A * | 6/1981 | Tokuda et al. | 701/113 |
| 4,312,310 A * | 1/1982 | Chivilo' et al. | 123/198 DB |
| 4,491,115 A | 1/1985 | Otobe et al. | |
| 4,750,466 A | 6/1988 | Hibino et al. | |
| 6,164,063 A | 12/2000 | Mendler | |
| 6,266,956 B1 | 7/2001 | Suzuki et al. | |
| 6,603,278 B1 | 8/2003 | Oshima et al. | |
| 6,681,564 B1 * | 1/2004 | Nishiyama et al. | 60/285 |
| 6,742,327 B1 | 6/2004 | Inoue et al. | |
| 6,763,298 B1 * | 7/2004 | Boggs et al. | 701/112 |
| 6,839,621 B1 * | 1/2005 | Kaneko | 701/112 |
| 2001/0025621 A1 * | 10/2001 | Shiraishi et al. | 123/305 |
| 2003/0046927 A1 | 3/2003 | Nagai et al. | |
| 2003/0106515 A1 | 6/2003 | Kondo | |
| 2005/0131618 A1 * | 6/2005 | Megli et al. | 701/101 |

FOREIGN PATENT DOCUMENTS

| | | |
|---|---|---|
| GB | 1270516 A | 4/1972 |
| GB | 2288638 A | 10/1995 |
| JP | 11173173 | 6/1999 |
| JP | 2002147287 | 5/2002 |

OTHER PUBLICATIONS

Cornelius, S.J., et al., *The role of oxygen storage in NO conversion in automotive catalysts*, Topics in Catalysis vol.: 16/17, Issue: 1/4, Sep. 2001, pp. 57-62.

* cited by examiner

*Primary Examiner*—Thomas Denion
*Assistant Examiner*—Loren Edwards
(74) *Attorney, Agent, or Firm*—David B. Kelley; Brooks Kushman

(57) ABSTRACT

A method of controlling exhaust emission oxides of nitrogen (NOx) from an internal combustion engine (ICE) includes the steps of determining when an engine speed is below a first predetermined level, and controlling an oxygen displacement valve (ODV) such that at least a portion of exhaust gas generated by the ICE is directed into an intake air flow of the ICE.

22 Claims, 2 Drawing Sheets

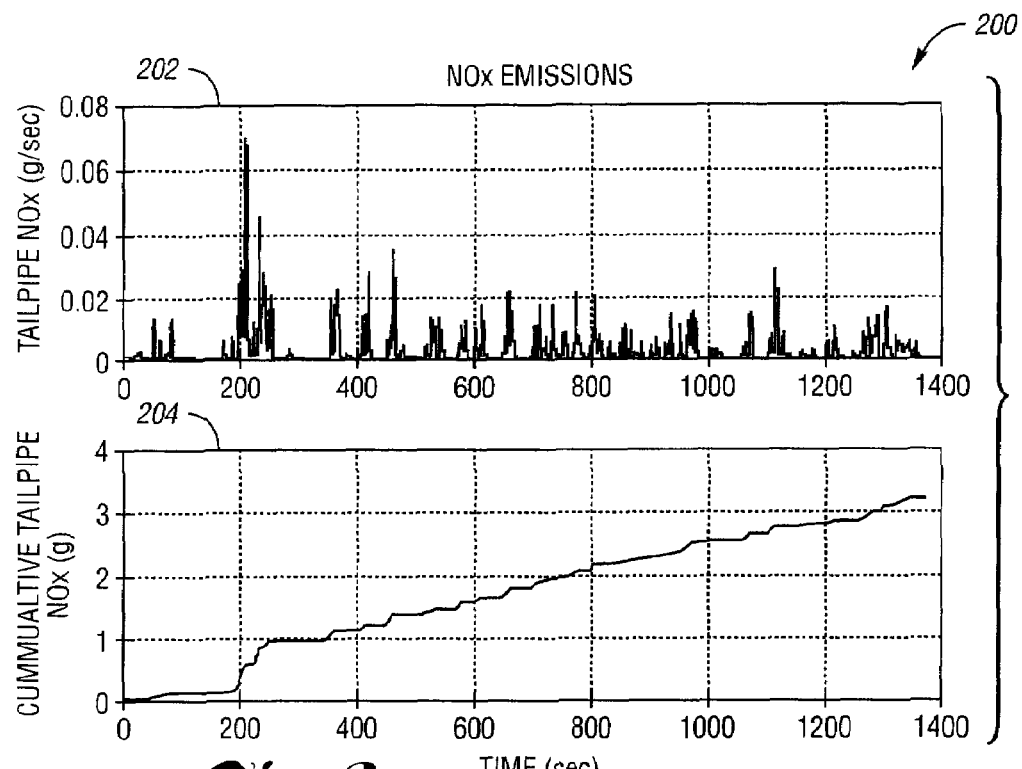
*Fig. 2a*
*(Conventional)*

SYSTEM AND METHOD FOR REDUCING NOX EMISSIONS AFTER FUEL CUT-OFF EVENTS

BACKGROUND OF INVENTION

1. Field of the Invention

The invention relates generally to a system and method for a strategy for the reduction of NOx emissions, and more particularly for the reduction of NOx emissions after fuel cut-off events in hybrid electric and conventional vehicles.

2. Background Art

During typical modes of operation, hybrid electric vehicles (HEVs) perform frequent engine shut off and restart operations. During engine shut downs and restarts, air is pumped into the exhaust system by the engine. A catalyst in the engine exhaust system adsorbs the oxygen from the air that is pumped into the exhaust system. Frequently, the oxygen is of sufficient volume to saturate the oxygen storage capacity of the catalyst. A three-way catalyst (TWC, i.e., a catalyst for simultaneous removal of CO, NOx and HC from the engine exhaust gas) that has saturated or nearly saturated oxygen storage capacity typically has diminished NOx conversion ability.

When combustion is resumed (i.e., when the engine is restarted), the NOx emissions from the engine are not efficiently reduced or eliminated by the catalytic converter until the oxygen storage level is reduced from the saturated level. In particular, a NOx spike can occur after an HEV engine restart.

Conventional methods for attempting to reduce the HEV restart NOx spike (i.e., limiting the number of times the engine shuts down) may not be totally effective. The NOx attributed to the HEV restart is a significant portion of the NOx standard for super/ultra low emissions vehicles (SULEV) vehicles.

Non-HEV vehicles (i.e., conventional vehicles) can also have a similar problem when shutting off fuel during high speed deceleration conditions (i.e., deceleration fuel cut-off). Restart NOx emissions are a problem during deceleration fuel cut-off of non-HEV vehicles as described above for engine restarts of HEVs. In both cases, as the engine spins to a low speed or stop a large amount of air can be pumped into the exhaust system (and catalyst). The large amount of air that can be pumped into the exhaust system can also cause undesirable catalyst cooling.

One example of a conventional approach for a method and apparatus for controlling an internal combustion engine capable of intermittent operations is disclosed in U.S. Pat. No. 6,742,327. The method and apparatus controls an internal combustion engine of a vehicle in which an exhaust purifying catalyst capable of storing oxygen is provided in an exhaust system of the engine. The internal combustion engine is adapted to be temporarily stopped when a predetermined condition for stopping the engine is satisfied, and resumes its operation when the predetermined condition is eliminated. The internal combustion engine is operated so as to reduce an amount of oxygen stored in the exhaust purifying catalyst during a temporary stoppage of the engine, before fuel starts being burned for resuming the operation of the engine.

However, such conventional approaches generally fail to efficiently reduce or eliminate NOx emissions from the engine until the oxygen storage level of the catalytic converter is reduced from the saturated level. In particular, such conventional approaches generally fail to reduce or eliminate the NOx spike that can occur after an HEV engine restart.

Thus, there is a need and desire for a system and a method to efficiently and effectively provide for controlling exhaust emissions to efficiently reduce or eliminate NOx emissions from the engine after fuel cut-off events.

SUMMARY OF INVENTION

A system and method is disclosed that substantially overcomes the limitations and shortcomings of conventional emissions control systems and methods. In accordance with one embodiment of the present invention, a method of controlling exhaust emission oxides of nitrogen (NOx) from an internal combustion engine (ICE) is disclosed. The method includes the steps of determining when an engine speed is below a first predetermined level, and controlling an oxygen displacement valve (ODV) such that at least a portion of exhaust gas generated by the ICE is directed into an intake air flow of the ICE.

Further, a system for controlling exhaust emission oxides of nitrogen (NOx) from an internal combustion engine (ICE) is disclosed. The system includes sensors for determining operating conditions of the ICE and a controller. The controller determines when an engine speed is below a first predetermined level, and controls an oxygen displacement valve (ODV) such that at least a portion of exhaust gas generated by the ICE is directed into an intake air flow of the ICE.

Yet further, a method of controlling exhaust emission oxides of nitrogen (NOx) from a variable valve internal combustion engine (ICE) is disclosed. The method includes the steps of determining when an engine speed is below a first predetermined level, and controlling the variable valves such that at least a portion of exhaust gas generated by the ICE is directed into an intake air flow of the ICE.

Further advantages, objectives and features of the invention will become apparent from the following detailed description and the accompanying figures disclosing illustrative embodiments of the invention.

DETAILED DESCRIPTION

Figure 1:
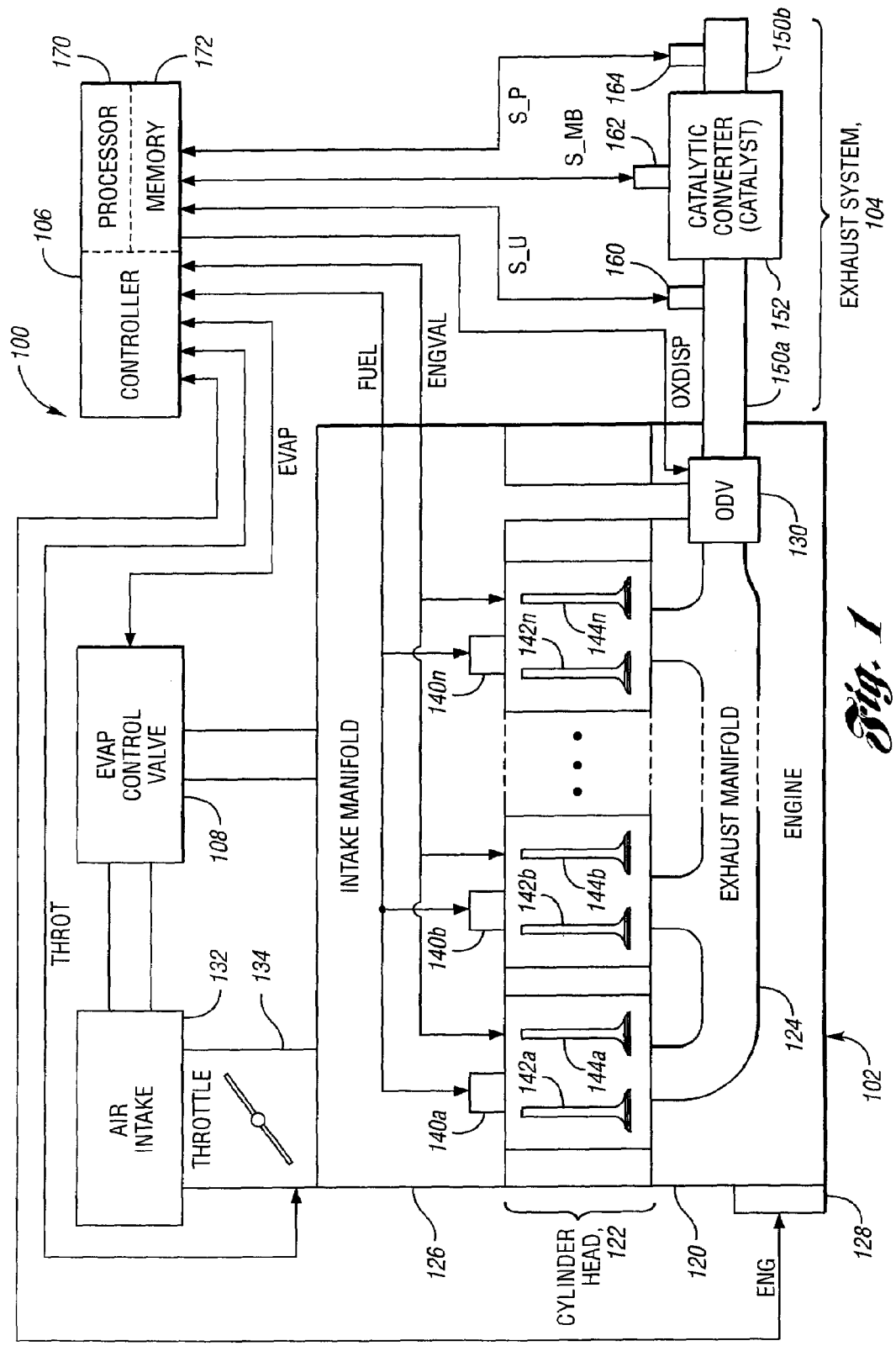
FIG. 1 is a diagram of a powertrain system of the present invention.

Hybrid electric vehicles (HEVs) utilize a combination of an internal combustion engine (ICE) in connection with an electric motor. The electric motor is fed electrical energy from a battery to provide the power needed to propel a vehicle (i.e., provide power to vehicle tractive wheels) for improved fuel economy when compared to a conventional (i.e., an internal combustion engine only) vehicle. In a hybrid vehicle, fuel economy can be improved and exhaust emissions can be reduced by shutting down (i.e., turning off) the engine, especially when the ICE operates inefficiently, and using the electric motor to provide all of the power needed to propel the vehicle.

However, when the user (e.g., driver of the vehicle) wants more power than the electric motor can provide or when the battery becomes depleted, the engine is generally restarted to provide the requested additional power. As such, HEVs typically perform frequent engine shut off and restart operations (i.e., events, conditions, modes of operation, etc.) during normal driving conditions. During engine shut downs and restarts, air is pumped by the engine into the exhaust system. An exhaust system catalytic converter (or catalyst) adsorbs the oxygen from the air. Frequently, the volume of the adsorbed oxygen is sufficient to saturate the oxygen storage capacity of the catalyst. A catalyst that has saturated or nearly saturated oxygen storage capacity can have poor NOx conversion ability. When combustion is resumed (i.e., when the hot engine is restarted), the NOx emissions from the engine are not efficiently reduced or eliminated by the catalytic converter until the oxygen storage level in the catalytic converter is reduced from the saturated level.

HEV hot engine restart operations can cause undesirably high NOx emissions levels in the exhaust gas. The strategy that is implemented in connection with the system and method of the present invention may significantly reduce the amount of NOx that is produced by a HEV or conventional powertrain system ICE restart event. In many cases, the strategy of the present invention can eliminate the presence of a NOx spike that may occur after an HEV ICE restart. Operation of the HEV using the electric motor generally produces an increase in vehicle fuel economy. As such, an improvement in NOx emissions performance that allows more engine shut downs (e.g., the system and method of the present invention) may also facilitate an increase in vehicle fuel economy.

During a fuel cut-off event (e.g., HEV ICE off or deceleration fuel cut-off) the engine generally pumps fresh air through the engine and exhaust system for an interval of time. The air that is pumped by the engine can cool the engine exhaust catalyst and alter the chemical state of the aftertreatment system (e.g., the exhaust system catalytic converter, catalyst), thereby increasing the amount of stored oxygen.

The system and method of the present invention may also be advantageously implemented in connection with conventional (i.e., ICE only propelled) vehicles during a deceleration fuel cut-off mode of operation. The system and method of the present invention may provide lower NOx emissions during conventional engine vehicle restart and may also provide longer fuel-off times due to decreased catalyst cooling when compared to conventional approaches. A longer engine fueling off time interval may provide increased vehicle fuel economy when compared to conventional approaches.

Referring to FIG. 1, a diagram of a powertrain system 100 of the present invention is shown. The system 100 generally comprises an ICE 102, an engine exhaust system 104, a controller (e.g., powertrain control module (PCM), engine control module (ECM), and the like) 106, and an evaporative emissions ("evap") control valve 108. The ICE 102 may be implemented as an engine that is fueled by gasoline, diesel, methane, propane, alcohol, etc. In one example, the system 100 may be advantageously implemented in connection with a hybrid electric vehicle (HEV) propulsion system. In another example, the system 100 may be advantageously implemented in connection with a conventional (i.e., ICE only) vehicle propulsion system.

The ICE 102 generally includes an engine block 120 having at least one cylinder head 122 mounted thereto. An exhaust manifold 124 and an intake manifold 126 are generally mounted to the cylinder head 122. At least one operating condition of the engine 102 (e.g., started, shut-down, crankshaft speed, crankshaft position, etc.) may be determined via at least one engine sensor 128. An oxygen displacement valve 130 may be installed in the exhaust manifold 124 or elsewhere in the exhaust system 104. Air generally enters the air intake 132, the intake air flows through a throttle assembly 134, and the air flows into the intake manifold 126.

The engine 102 is generally provided measured fuel via injectors 140 (e.g., injectors 140a–140n) that are positioned in the cylinder head 122 (i.e., direct injection) or in the intake manifold 126 to provide the fuel to respective engine cylinders. The cylinder head 122 generally contains at least one respective intake valve 142 (e.g., intake valves 142a–142n) and at least one respective exhaust valve 144 (e.g., exhaust valves 144a–144n) for each cylinder. The intake valves 142 generally control the flow of an air and fuel mixture or of air from the intake manifold 126 into the engine cylinder. The exhaust valves 144 generally control the flow of exhaust gas from the engine cylinder into the exhaust manifold 124.

The throttle 134 generally operates in connection with the fuel injectors 140 and the controller 106 to provide a proper air-to-fuel ratio (AFR) mixture for the mode of operation of the engine 102 that is desired by a user (e.g., driver) of the vehicle where the powertrain system 100 is installed.

The exhaust system 104 generally comprises an exhaust pipe section 150a, an exhaust pipe section 150b (i.e., a tailpipe), and a catalytic converter (i.e., catalyst) 152. The exhaust system 104 generally receives exhaust gas from the engine 102 via the exhaust manifold 124 and presents the engine exhaust gas to the atmosphere. A first end of the pipe 150a may be connected to the engine 102 (e.g., at the exhaust manifold 124) and a second end of the pipe 150a may be connected to an inlet of the catalyst 152. An outlet of the catalyst 152 may be connected to a first end of the tailpipe 150b and a second end of the pipe 150b may present the engine exhaust gas to the atmosphere.

The catalyst 152 is generally implemented as a three-way catalyst (TWC, i.e., a catalytic converter having a first or front catalyst at the inlet end and a second or rear catalyst at the outlet end). A number of engine exhaust gas oxygen (EGO) sensors are generally installed (i.e., mounted, fastened, etc.) at various locations in the exhaust system 104 to dynamically determine exhaust gas oxygen and other exhaust gas component levels at the respective installation locations. An engine-out exhaust gas oxygen (EGO) sensor 160 may be installed in the pipe 150a, a mid-bed oxygen (EGO) sensor 162 may be installed at a mid-bed location in the catalyst 152 (i.e., at a location between the front and rear catalysts in the TWC 152), and a post-catalyst oxygen (EGO) sensor 164 may be installed in the pipe 150b.

The improved system and method (i.e., process, operation, routine, steps, blocks, algorithm, etc.) for dynamically controlling engine exhaust emissions of the present invention is generally implemented in connection with a processor 170 and at least one memory (e.g., random access memory (RAM), read only memory (ROM), EPROM, EEPROM, flash, etc.) 172 in the controller 106. The engine 102 and related components and sensors are generally electrically connected (coupled) to and in communication with the controller 106.

The powertrain controller 106 generally presents/receives a number of signals that may be processed (e.g., filtered, compared, logically operated upon, analyzed, etc.) to determine (i.e., detect, calculate, etc.) when an engine shutdown and when an engine restart have occurred, and to initiate one or more processes (e.g., the processes of the present invention) in response to the shutdown and the restart operations. The processes of the present invention may be implemented in hardware (e.g., logic circuitry), software, firmware, and any appropriate combination thereof to meet the design criteria of a particular application. The processes performed using the controller 106 may be implemented in connection with on-board diagnosis (OBD) of NOx performance.

The controller 106 may receive/present a signal (e.g., ENG) from/to the sensor 128, a signal (e.g., THROT) from/to the throttle assembly 134, a signal (e.g., EVAP) from/to the control valve 108, a signal (e.g., FUEL) from/to the injectors 140, a signal (e.g., ENGVAL) from/to the valves 142 and 144, a signal (e.g., OXDISP) from/to the valve 130, a signal (e.g., S_U) from/to the EGO sensor 160, a signal (e.g., S_MB) from/to the EGO sensor 162, and a signal (e.g., S_P) from/to the EGO sensor 164. The signal ENG generally provides the controller 106 information related to at least one operating condition of the engine 102. The signal THROT generally provides information regarding the position of the throttle 134 or controls the position of the throttle 134.

The signal EVAP generally provides information regarding the position of the evap valve 108 or controls the position of the evap valve 108. The signal FUEL generally controls the fuel injectors 140. The signal ENGVAL is generally implemented in connection with an engine 102 having variable valve timing. The signal ENGVAL generally controls the operation of the valves 142 and 144.

The signal OXDISP generally provides information regarding the position of the ODV 130 and control of the position of the ODV 130. The signals S_U, S_MB, and S_P generally provide information related to exhaust gas emissions (e.g., NOx levels) at the respective locations in the exhaust system 104. The signals S_U, S_MB, and S_P may be related engine air-to-fuel ratio (AFR), NOx emissions, and the like.

The control valve 108 may be connected to the intake manifold 126 and the air intake 132. The control valve 108 may direct the flow of evaporative fuel vapors into at least one of the intake manifold 126, the air intake 132, and the intake manifold 126 and the air intake 132 in response to the signal EVAP.

In one example, the ODV 130 may be implemented as an exhaust gas regeneration (EGR) valve. However, the ODV 130 may be implemented as any appropriate valve that controls exhaust gas flow from at least one of the exhaust manifold 124 and the exhaust system 104 into the intake air flow in response to the signal OXDISP.

During shutdown and restart of the engine 102, some additional oxygen is generally pumped into the exhaust system 104. Very rapidly, the engine 102 generally begins stops (or, alternatively) starts combusting (i.e., a shutdown, or alternatively, restart operation is performed). As discussed above, the additional oxygen is generally undesirable. As such, at least one process in accordance with the present invention is generally implemented to provide reduction in the amount of air that is pumped into the engine 102 and the exhaust 104.

Application to HEVS

In one example, an engine shutdown and restart procedure of the present invention that generally mitigates the restart exhaust gas NOx spike that may occur in connection with operation of an HEV generally comprises at least one of the following steps.

i. A decision to shut down the engine 102 is generally performed via the controller 106 in response to operating conditions of the vehicle where the system 100 is implemented. For example, the electric motor (not shown) that is implemented in connection with the powertrain system 100 in an HEV application may provide adequate power for the vehicle operating condition.

ii. The engine throttle 134 may be fully closed by the vehicle controller 106 (e.g., via or in response to the signal TH ROT).

iii. The engine controller 106 generally commands (i.e., controls) a rich air to fuel ratio (AFR) (i.e., a rich AFR is provided to the engine 102) for a (first) predetermined period of time via or in response to the signal FUEL).

iv. The vehicle controller 106 generally opens the engine ODV valve 130 (e.g., the ODV 130 directs, controls, diverts, etc. at least a portion of the exhaust gas generated by the ICE 102 into the intake air flow of the ICE 102 via or in response to the signal OXDISP) when the engine 102 is operating below a predetermined threshold speed (e.g., when the signal ENG provides an indication that the engine 102 RPM is below the predetermined threshold speed, e.g., first predetermined speed).

v. The vehicle controller 106 generally stops fueling the engine 102 (e.g., the signal FUEL is asserted/de-asserted to control stop delivery of fuel to the engine 102).

vi. The engine 102 generally spins to a stop (e.g., the engine 102 proceeds to a shutdown condition).

vii. The engine 102 generally remains at a shutdown condition until the controller 106 determines that a restart operation is appropriate.

viii. A decision is made to restart the engine 102 (i.e., the controller 106 determines that a restart operation is appropriate).

ix. The ODV valve 130 is generally closed (e.g., no exhaust gas is directed into the intake air flow via or in response the signal OXDISP).

x. The engine 102 is spun up to a desired or appropriate starting speed (e.g., a second predetermined speed) using a starter or an electric machine that is operated as a starter (not shown).

xi. Fuel is provided to the injectors 140 when the controller 106 determines that the engine 102 has reached the appropriate starting speed (e.g., the controller 106 may monitor the signal ENG, and when the signal ENG indicates that the engine 102 is at or above the starting speed, the controller 106 may assert/de-assert the signal FUEL as appropriate to control fuel flow to the injectors 140).

xii. The engine controller 106 generally commands a rich AFR (i.e., a rich AFR is provided to the engine 102) for a brief (i.e., a second) predetermined period of time (e.g., via or in response the signal FUEL).

xiii. The throttle 134 is opened to the desired predetermined position for an engine starting operation by the vehicle controller 106 (e.g., via or in response to the signal TH ROT).

The engine 102 shutdown and restart procedures of the present invention may further include at least one of the following steps.

a. The throttle 134 may be closed when fuel is cut-off during engine 102 spin down (e.g., the controller 106 may command the signals THROT and FUEL to close the throttle 134 and to stop delivery of fuel to the injectors 140 when the signal ENG indicates that the speed of the engine 102 is decreasing during a shutdown operation).

b. The controller 106 may assert (i.e., present, transmit, send, etc.) the signal THROT such that the throttle 134 is closed until delivery of fuel to the injectors 140 is resumed (e.g., in response to the signal FUEL) when an engine spin up operation is performed.

c. The controller 106 may assert the signal FUEL such that delivery of fuel to the injectors 140 is delayed until the speed of the engine 102 is below a predetermined value (e.g., the first predetermined speed) during an engine spin down operation.

d. The controller 106 may assert the signal FUEL such that delivery of fuel to the injectors 140 is initiated and maintained when the speed of the engine 102 is at or above a (third) predetermined value during an engine spin up operation.

e. The controller 106 may assert the signal FUEL such that delivery of fuel to the injectors 140 is initiated and maintained to produce a stoichiometric or rich combustion when the speed of the engine 102 is at or above a (fourth) predetermined value during an engine restart operation.

f. The controller 106 may assert the signal OXDISP such that the ODV valve 130 is open (i.e., exhaust gas is directed from the exhaust system 104 to the intake air flow) during at least some of the time intervals of the engine 102 spin down and spin up processes.

g. In the example of the engine 102 having a flexible valve timing system (e.g., the valves 142 and 144 are implemented in connection with a variable valve timing system), valve timing may be controlled to reduce the amount of air that is pumped by the engine 102 into the exhaust system 104. For example, when the engine 102 is equipped with a fully flexible valve system (e.g., an electromagnetic valve actuation, EVA, system, and the like), the intake valves 142 can be held open with the exhaust valves 144 shut (or vice versa) in response to the signal ENGVAL to reduce or eliminate air being pumped by the engine 102 into the exhaust manifold 124 and the exhaust system 104.

Yet further, the engine 102 shutdown and restart procedures of the present invention may include steps (e.g., monitoring the signals S_U, S_MB and S_P, and presenting the signal FUEL to control the delivery of fuel via the injectors 140) such that the air-to-fuel ratio is controlled to affect the catalyst 152 oxygen storage before, during, and after engine 102 shutdown operations.

Running the powertrain system 100 in a rich condition generally has the effect of eliminating a portion of the oxygen that is stored on the catalyst 152 until all oxygen is removed. Running the powertrain system 100 in a lean condition generally has the effect of increasing the amount of stored oxygen until the catalyst 152 is saturated with oxygen. A brief time period (e.g., the time interval of the delay until the speed of the engine 102 spins down to a value below the second predetermined speed value) of rich air to fuel ratio generally reduces the amount of oxygen stored on the catalyst 152, and prepares the catalyst 152 to adsorb an amount of oxygen before the shutdown is actually commenced (i.e., initiated, began, etc.).

By keeping the throttle 134 fully closed during shutdown operations, a minimal amount of air may be drawn into the engine 102 through the throttle body 134, and the amount of air being pumped by the engine 102 is generally reduced.

Fuel may be provided to the injectors 140 (i.e., the controller 106 asserts/de-asserts the signal FUEL) for as long as possible (i.e., for the first predetermined time interval) during the shutdown procedure. In particular, the threshold speed that is implemented as the criteria for cutting off the engine fueling is determined at a speed than generally prevents fuel cut off at a high engine speed (e.g., a speed greater than 600 RPM preferably, and at a speed that is nominally greater than 550 RPM). When fuel is cut off at a high engine speed, the amount of air pumped by the engine during the shutdown is generally increased significantly.

Opening the ODV valve 130 (i.e., directing at least a portion of the exhaust gas into the intake air flow) during the shutdown event generally provides at least two advantages over conventional approaches. The first advantage is that instead of drawing air into the intake manifold 126 exclusively through the throttle 134, the intake manifold 126 will instead draw in at least a portion of the exhaust gas through the ODV valve 130. Since exhaust gas is largely depleted of oxygen, exhaust gas may offset the oxygen that would have entered the intake manifold 126 through the throttle body 134.

The second advantage is that when the engine 102 stops spinning, the vapor pressure inside of the intake manifold 126 generally rises to atmospheric pressure. When the ODV valve 130 is open, the intake manifold 126 generally fills with primarily exhaust gas instead of fresh air. During the restart event, the intake manifold 126 is largely filled with oxygen deficient gas (e.g., exhaust gas) that does not contribute to catalyst 152 oxygen storage. Opening the ODV 130 during shutdown may significantly reduce the amount of oxygen being pumped into the exhaust system 104 when compared to a conventional shutdown operation.

As with the shutdown operation, during a restart operation of the present invention, the throttle 134 generally remains closed until the engine 102 is started or is ready to start. Also, fueling is generally resumed as soon as possible (i.e., the signal FUEL is generally asserted when the engine speed reaches the first predetermined RPM level). A brief period of rich operation (e.g., rich operation for the second predetermined time interval) of the system 100 generally reduces the amount of oxygen stored on the catalyst 152. The rich period generally reduces at least a portion of the oxygen that was stored on the catalyst 152 by the engine 102 pumping air into the exhaust system 104.

Application to Deceleration Fuel Cut-Off

In another example, at least one procedure according to the present invention may be implemented for a deceleration fuel cut-off operation (e.g., in connection with a conventional ICE only vehicle). In one example of the present invention, such an algorithm generally comprises at least one of the following steps.

a. A decision to cut (i.e., discontinue, stop, etc.) delivery of fuel to the engine 102 is generally performed via the controller 106 in response to operating conditions of the vehicle where the system 100 is implemented.

b. The engine throttle 134 may be fully closed by the vehicle controller 106 (e.g., via or in response to the signal THROT) or by the user (e.g., driver) of the vehicle.

c. The vehicle controller 106 generally controls (e.g., opens) the engine ODV valve 130 (e.g., directs at least a portion of the exhaust gas into the intake air flow via or in response to the signal OXDISP) when the engine 102 is operating below the predetermined threshold speed (e.g., when the signal ENG provides an indication that the engine 102 RPM is below the predetermined threshold speed, e.g., the first predetermined speed).

d. The vehicle controller 106 generally stops fueling the engine 102 (e.g., the signal FUEL is asserted/de-asserted to control stopping delivery of fuel to the engine 102).

e. The engine 102 generally remains spinning.

f. A decision is made to resume fueling the engine 102 (i.e., the controller 106 determines that a fueling operation is appropriate).

g. The ODV valve 130 is generally controlled (e.g., closed) such that no exhaust gas is directed into the intake air flow via or in response the signal OXDISP.

h. The throttle 134 is opened to the desired position for the engine operation by the vehicle controller 106 (e.g., via or in response to the signal THROT) or by the user.

i. Fuel is provided to the injectors 140 (e.g., the controller 106 may assert/de-assert the signal FUEL as appropriate to control fuel flow to the injectors 140).

j. The engine 102 begins combusting (e.g., engine 102 ignition starts).

k. The engine controller 106 generally commands a rich AFR for a brief (i.e., the second) predetermined period of time (e.g., via or in response the signal FUEL).

By operating (i.e., opening) the ODV valve 130 during fuel cut-off (i.e., diverting exhaust gas into the intake air flow), the amount of oxygen adsorbed by the catalyst 152 is generally reduced, and the temperature drop from the catalyst 152 is also generally reduced when compared to conventional approaches.

Methods Utilizing Variable Valve Technology

When the engine 102 is equipped with variable valve technology, the volume of oxygen that is pumped by the engine 102 may be significantly reduced by manipulating (i.e., controlling) at least one of the valves 142 and 144 during a fuel cut off event when compared to conventional approaches. In one example, the intake valves 142 may be fully shut at fuel cut off (e.g., the controller 106 may assert/de-assert the signal ENGVAL as appropriate). As such, the flow of air into the cylinders and thus into the exhaust 104 may be reduced or eliminated.

In another example, the valve train (i.e., the valves 142 and 144) be manipulated (i.e., controlled, commanded, etc.) to pump exhaust gas into the intake manifold 126. Control of the valves 142 and 144 in response to the signal ENGVAL may mimic (i.e., control flow of exhaust gas into the intake air flow substantially the same as) the ODV valve 130 operation in response to the signal OXDISP as detailed above. That is, the variable valves 142 and 144 may be controlled such that at least a portion of exhaust gas generated by the ICE 102 is directed into an intake air flow when a decision is made to shut down the ICE 102. The variable valves 142 and 144 may be controlled such that no exhaust gas is directed into the intake air flow when a decision is made to restart the engine 102.

Use of Purge Vapor to Provide Rich Conditions

In another example, vapors from the evaporative emissions system may be purged to generate rich operating conditions for the powertrain system 100. Using conventional approaches, adequate purging has proven difficult with HEVs due to the general lack of engine idle operation time, during which the canister is typically purged. By controlling (e.g., opening) the purge valve 108 to provide rich conditions to at least one of the intake manifold 126 and the air intake 132 in response to the signal EVAP, rapid evacuation of the fuel vapors may be performed at a time interval during which precise control of the level of richness is substantially unimportant for emissions control.

Figure 2B:
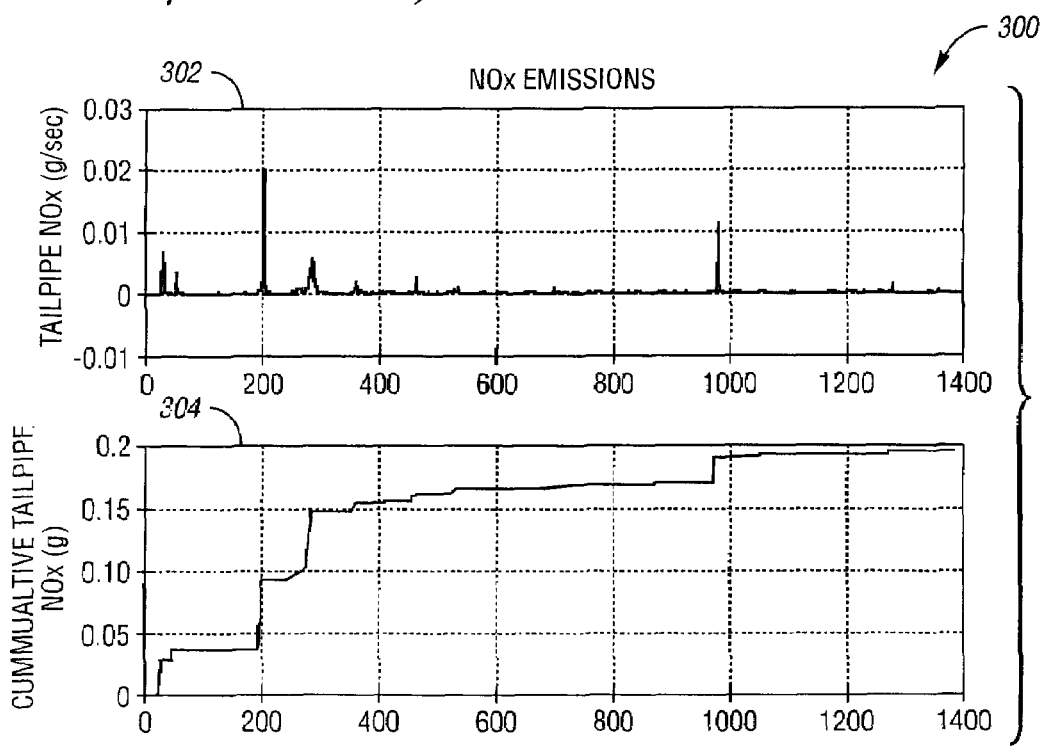
FIGS. 2(a–b) are diagrams of plots of tailpipe oxides of nitrogen (NOx) for a conventional powertrain system and a powertrain system according to the present invention, respectively.

Referring to FIGS. 2(a–b), a diagram 200 illustrating exhaust gas NOx emissions from a vehicle using a conventional approach, and a diagram 300 illustrating exhaust gas NOx emissions from a comparable vehicle using the strategy of the system and method of the present invention, respectively, are shown. Plots 202 and 302 generally represent the instantaneous tailpipe NOx emissions from the vehicles using the conventional approach and the system and method of the present invention, respectively. Plots 204 and 304 generally represent the cumulative tailpipe NOx emissions from the vehicles using the conventional approach and the system and method of the present invention, respectively. The hot-start Federal Urban Driving Schedule (FUDS) emissions were 0.43 g/mile and 0.026 g/mile, for the vehicles using the conventional, and the system and method of the present invention, respectively.

As is readily apparent then, the system and the method of the present invention efficiently and effectively provide for controlling exhaust emissions to efficiently reduce or eliminate NOx emissions from the engine after fuel cut-off events.

While the best mode for carrying out the invention has been described in detail, those familiar with the art to which this invention relates will recognize various alternative designs and embodiments for practicing the invention as defined by the following claims.

The invention claimed is:

1. A method of controlling exhaust emission oxides of nitrogen (NOx) from an internal combustion engine (ICE), the method comprising:
   commanding an engine shutdown;
   determining when an engine speed is below a first predetermined level after the engine shutdown is commanded; and
   controlling an oxygen displacement valve (ODV) such that at least a portion of exhaust gas generated by the ICE is directed into an intake air flow of the ICE when it is determined that the engine speed is below the first predetermined level.

2. The method set forth in claim 1 wherein the engine shutdown is commanded during a deceleration operation of a conventional powertrain vehicle.

3. The method set forth in claim 1 further comprising fully closing an engine throttle to facilitate the engine shutdown.

4. The method set forth in claim 1 further comprising providing a rich air to fuel ratio (AFR) to the ICE for a first predetermined period of time after the engine shutdown is commanded.

5. The method set forth in claim 4 further comprising stopping delivery of fuel to the engine to facilitate the engine shutdown.

6. The method set forth in claim 1 further comprising:
   commanding an engine restart; and
   controlling the ODV valve such that no exhaust gas is directed into the intake air flow after the engine restart is commanded.

7. The method set forth in claim 6 further comprising spinning up the engine up to a starting speed.

8. The method set forth in claim 7 further comprising providing a rich AFR to the engine for a second predetermined period of time after the engine reaches the starting speed.

9. The method set forth in claim 8 wherein the rich AFR is provided by controlling an evaporative control valve such that at least a portion of fuel evaporative vapors are directed to the intake air flow.

10. The method set forth in claim 6 further comprising opening a throttle after the engine restart is commanded.

11. A system for controlling exhaust emission oxides of nitrogen (NOx) from an internal combustion engine (ICE), the system comprising:
   sensors for determining operating conditions of the ICE; and
   a controller configured to command an engine shutdown, determine when an engine speed is below a first predetermined level, and control an oxygen displacement valve (ODV) such that at least a portion of exhaust gas generated by the ICE is directed into an intake air flow of the ICE after an engine shutdown is commanded and the engine speed is below the first predetermined level.

12. The system set forth in claim 11 wherein the controller is configured to command an engine shutdown during a deceleration operation of a conventional powertrain vehicle.

13. The system set forth in claim 11 wherein the controller is further configured to fully close an engine throttle to facilitate an engine shutdown.

14. The system set forth in claim 11 wherein the controller is further configured to provide a rich air to fuel ratio (AFR) to the ICE for a first predetermined period of time after an engine shutdown is commanded.

15. The system set forth in claim 14 wherein the rich AFR is provided by controlling an evaporative control valve such that at least a portion of fuel evaporative vapors are directed to the intake air flow.

16. The system set forth in claim 14 wherein the controller is further configured to stop delivery of fuel to the engine to facilitate an engine shutdown.

17. The system set forth in claim 11 wherein the controller is further configured to command an engine restart, and to operate the ODV valve such that no exhaust gas is directed into the intake air flow when a decision is made to restart the engine after an engine restart is commanded.

18. The system set forth in claim 17 wherein the controller is further configured to control spinning up the engine up to a starting speed.

19. The system set forth in claim 18 wherein the controller is further configured to provide a rich AFR to the engine for a second predetermined period of time after the engine reaches the starting speed.

20. The system set forth in claim 17 wherein the controller is further configured to open a throttle after an engine restart is commanded.

21. A method of controlling exhaust emission oxides of nitrogen (NOx) from a variable valve internal combustion engine (ICE), the method comprising:

commanding an engine shutdown:

determining when an engine speed is below a first predetermined level after the engine shutdown is commanded; and controlling the variable valves such that at least a portion of exhaust gas generated by the ICE is directed into an intake air flow of the ICE when it is determined that the engine speed is below the first predetermined level.

22. The method set forth in claim 21 further including the steps of:

commanding an ICE restart; and controlling the variable valves such that no exhaust gas is directed into the intake air flow after the ICE is commanded to restart.

* * * * *